Figure 1:
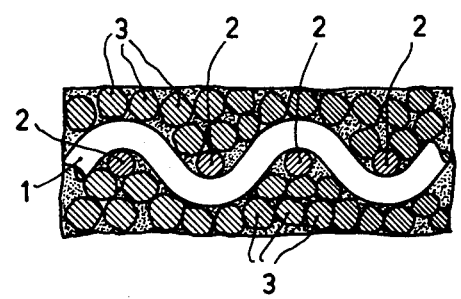

United States Patent [19]

Boter

[11] 4,048,407
[45] Sept. 13, 1977

[54] ELECTRODE FOR PRIMARY OR SECONDARY BATTERY AND METHOD FOR PRODUCING SUCH AN ELECTRODE

[75] Inventor: Pieter Abraham Boter, Eindhoven, Netherlands

[73] Assignee: U.S. Philips Corporation, New York, N.Y.

[21] Appl. No.: 721,662

[22] Filed: Sept. 9, 1976

[30] Foreign Application Priority Data

Sept. 19, 1975 Netherlands ............... 7411044

[51] Int. Cl.² .................................. H01M 4/38
[52] U.S. Cl. .................................. 429/217; 429/218; 429/223
[58] Field of Search ............ 429/217, 218, 223, 232, 429/209, 218, 59

[56] References Cited

U.S. PATENT DOCUMENTS

| 3,874,928 | 4/1975 | Will | 429/223 |
| 3,918,989 | 11/1975 | Gillman et al. | 429/217 |
| 3,980,501 | 9/1976 | Feder et al. | 429/60 |

*Primary Examiner*—Anthony Skapars
*Attorney, Agent, or Firm*—Frank R. Trifari; Carl P. Steinhauser

[57] ABSTRACT

Electrode for a primary of secondary battery the electrochemically active part of which comprises a porous layer of a hydride of an intermetallic compound which is sintered to a metallic support, the pores being filled with a hydrophylic water-insoluble macromolecular material.

7 Claims, 2 Drawing Figures

U.S. Patent     Sept. 13, 1977     4,048,407

ELECTRODE FOR PRIMARY OR SECONDARY BATTERY AND METHOD FOR PRODUCING SUCH AN ELECTRODE

The invention relates to an electrode for a primary or secondary battery, the electrochemical active part of which comprises an intermetallic compound which can absorb and release reversibly hydrogen while forming hydrides.

Such an electrode may, for example, constitute the negative electrode in a primary or secondary battery. During the supply of electric energy the reaction H → H+ + e takes place. The inermetallic compounds used for this purpose are, generally, brittle. With a repeated charging and discharging such as this takes place with a secondary battery or accumulator the material expands and shrinks respectively which may cause the material to pulverize. For this reason it is substantially impossible to fabricate an electrode having a suitable life from the material alone, for example by means of sintering. It is known to increase the mechanical strength of the electrodes by applying the active electrode material on a metallic support. In itself this method appears insufficient for electrodes in which the electrochemically active part consists of an intermetallic compound and which, during charging and discharging absorb and release reversible hydrogen while forming hydrides to maintain the cohesion in the electrochemically active part of the electrode. To fully utilize the good electrochemical loadability of the intermetallic compounds to be used it is furthermore desirable to give the electrodes a large surface area and to choose the distance between the electrodes to be small in view of the internal resistance. This may be achieved by making the positive and negative electrode in the form of a strip and, for example, to wind them into a roll while separating them from one another by means of a separator. With this construction the electrodes must, of course, be flexible. It is also possible to combine a plurality of strip-shaped electrodes to a package, separated by means of separator layers.

It is an object of the invention to provide a flexible electrode which has a life which is sufficient for the desired purpose, in which the electrochemically active part of the electrode consists of an intermetallic compound which can absorb and release reversible hydrogen.

According to the invention this object is fulfilled by means of an electrode consisting of a porous metal support provided with a porous, sintered layer of a powder of the intermetallic compound in which the pores of the sintered layer contain a hydrophylic, water-insoluble macromolecular substance.

An electrode according to the invention may, for example, be obtained in the following manner:

An intermetallic compound is pulverized by charging it with hydrogen and by liberating it from hydrogen once or several times. Suitable intermetallic compounds are, for example, lanthanum-nickel (LaNi$_5$) and lanthanum-nickel compounds in which the lanthanum is partly replaced by another rare earth metal and in which nickel is, for example partly, replaced by cobalt, copper and iron. It is recommended that compounds in which the so-called plateau-pressure does not exceed 1 atmosphere at the operating temperature be used. A suitable compound is, for example, LaNi$_4$Cu, the plateau pressure of which is between 0.7 and 0.8 atmosphere at 20° C. In this connection plateau pressure must be understood to mean that hydrogen pressure at a given temperature over the intermetallic compound which is independent of the hydrogen concentration in the compound. The powder of the intermetallic compound may be applied to the metal support in various manners, for example by means of a binder. To this end the powder, which may consist fully or partly of the hydride is, for example, suspended in an organic solvent, in which also the binder can be dissolved. Suitable organic solvents are for example: toluene, xylene, propanol.

Thereafter an organic binder is added to the suspension obtained, in a next step it must be possible to remove this binder by means of firing without leaving any residue. For this purpose polysterene and nitrocellulose may, for example be used as binder in a quantity of, for example, 20 g per 100 ml of solvent. Thereafter a strip of metal gauze is uniformly coated on both sides or on one side, what ever the requirement, with the suspension and dried. The metal gauze may, for example, consist of nickel or stainless steel. A perforated metal plate may also be used as porous metal support. Now the binder is first removed by firing in a furnace and thereafter the powder is sintered. To this end the temperature is kept constant for some time at a value at which the binder evaporates or decomposes. For the binders mentioned this temperature is generally 250°–300° C. Sintering takes place at approximately 900° C for, for example, at least five minutes. Sintering is preferably done in vacuum or in a reducing atmosphere. The powder of the intermetallic compound may also be applied to the metal gauze by means of electrophoresis. The powder is then suspended in a polar organic solvent such as methanol. The metal support is placed in the suspension and connected, for example as cathode. After a layer of the desired thickness has been obtained it is sintered as described above. The porous layer obtained in this way is thereafter impregnated with a solution of a macromolecular substance which is either hydropylic and which, in a next processing, has been made water-insoluble, for example by means of a heat treatment or radiation, or which is insoluble in water and is made hydrophylic in a following process, for example by means of saponification, in which the macromolecular substance must, of course, remain insoluble in water. As hydrophylic macromolecular substances, especially macromolecular substances may be used with alcoholic hydroxyl groups which can be made water-insoluble in, for example, an aqueous electrolyte, by means of a physical treatment such as a heat treatment either, or not, in the presence of an auxiliary substance which promotes, or effects hardening, or crosslinking. Polyvinylalcohol has, for example, proved particularly suitable for use as an electrode according to the invention in an aqueous electrolyte. In that case ammonium chloride or sodium hydrosulphate may, for example, be used as auxiliary material. The heat treatment consists in this case of heating to 120°–150° C for 10 to 20 minutes in a furnace in air. Water-insoluble macromolecular substances which may be used in the production are, for example, sponifiable cellulose derivatives such as cellulose acetate butyrate which are soluble in organic solvents. After impregnating the macromolecular substance is saponified by means of, for example, an alcoholic lye.

By means of the sintering operation described above it is achieved that the hydrogen transfer between the particles of the intermetallic compounds can take place in a sufficient degree. The hydrophylic macromolecular substance serves as a binder which guarantees a permanent cohesion of the porous layer during charging and discharging.

Owing to the hydrophylic character of the binder, an aqueous electrolyte can penetrate into the sintered layer which enables ion transport. The aqueous electrolyte may, for example, consist of a solution of potassium hydroxide. In that case the counter electrode then consists, for example, of NiOOH or manganese dioxide. The hydrophylic binder generally does not, or hardly, increase the internal resistance.

Figure 2:
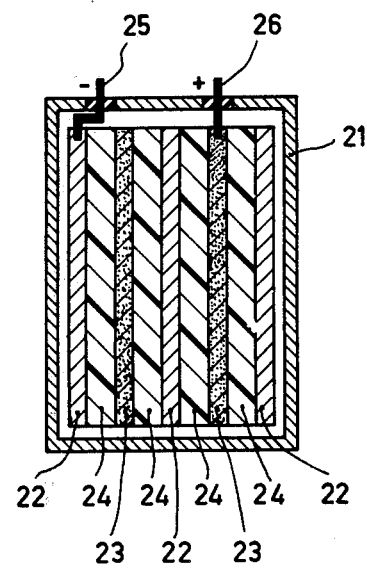

The method according to the invention will be further explained with reference to the accompanying drawing in which FIG. 1 shows on an enlarged scale a cross-section of part of an electrode, and FIG. 2 shows diagrammatically in side view a cross-section of a secondary battery.

The reference numerals in FIG. 1 have the following meaning. References 1 and 2 indicate the crosswise wires of a metal gauze. A layer of granules 3 of an intermetallic compound is sintered to both sides of this gauze 1-2. An hydrophylic macromolecular material is between the granules 3.

EMBODIMENT I

The relevant electrode may, for example, be produced as follows: 25 parts by volume of $LaNi_4Cu$ powder which has been obtained by charging the relevant material with hydrogen and by thereafter withdrawing hydrogen from the hydride form, is suspended in 75 parts by volume of toluene. 20 g of polystyrene is added per 100 ml of the suspension. After the polystyrene has been fully dissolved while stirring, a strip of nickel gauze (the wire diameter 0.15 mm, 64 wires per $cm^2$) is homogeneously coated with the suspension on both sides, whereafter the suspension is dried in air at 80° C. Thereafter, the binder is expelled at 250° C whereafter the layer is sintered at 900° C for 5 minutes in vacuum. Thereafter, the porous layer is impregnated with a solution of polyvinyl alcohol in water (10 g per 100 ml) which contains $NH_4Cl$ (0.1 g per 10 g of polyvinylalcohol). After drying in air at 80° C the polyvinyl alcohol is made insoluble by heating at 120° C for 15 minutes. The ammonium chloride which acts as hardener is thereafter washed away with water. The product obtained is now suitable for use as electrode.

EMBODIMENT II 10 g of $LaNi_4Cu$ powder is suspended in 100 ml of methanol while stirring. The metal gauze to be coated is placed in the suspension together with a counter electrode. A dc voltage of 30 volts/cm is applied while the metal gauze to be coated acts as negative electrode. In these circumstances approximately 25 mg of $LaNi_4Cu$ per $cm^2$ is deposited on the metal gauze in 30 seconds. In this method a sufficient quantity of the intermetallic compound is also deposited on the edges and corners of the metal support, which sometimes entails difficulties when the method described in Embodiment I is used.

After drying, the $LaNi_4Cu$-coated gauze is subjected to a sintering treatment (900° C for 5 minutes in vacuum). After cooling the gauze is immersed in a solution of cellulose acetate butyrate in methylene chloride (15 g of cellulose acetate butyrate in 85 g of methylene chloride). After drying the cellulose acetate butyrate is saponified in an alcoholic lye (6 g of KOH in 94 g of ethanol) for 1 minute. The product obtained may now be used as electrode.

The secondary battery shown diagrammatically in FIG. 2 comprises in a casing 21 which, for example, consists of nickel or nickel plated steel a package, composed at $LaNi_4Cu$-coated metal gauze strips 22 (negative electrode), of porous nickel layers 23 (positive electrode) which comprise $Ni(OH)_2$ and separators of polypropylene fibers (felty) 24. The strips 22 and the layers 23 are each interconnected (not shown) and connected to the poles 25 and 26 respectively. The electrolyte 25 in the battery consists of an aqueous KOH solution which contains 40% by weight of KOH.

The electrodes according to the invention show no evidence of a decline in capacity, also not after repeated charging and discharging.

What is claimed is:

1. An electrode for a primary or secondary battery comprising a porous metal support, a porous sintered layer of a powder of an intermetallic compound which can absorb and release reversibly hydrogen while forming hydrides, a hydrophylic water-insoluble macromolecular material in the pores of the sintered layer.

2. An electrode as claimed in claim 1 wherein the intermetallic compound is a lanthanum-nickel compound having a plateau pressure not exceeding one atmosphere at the operating temperature.

3. An electrode as claimed in claim 2 wherein the intermetallic compound is $LaNi_4Cu$.

4. An electrode as claimed in claim 2 wherein the hydrophylic macromolecular material has alcoholic hydroxyl groups.

5. An electrode as claimed in claim 4 wherein the hydrophylic macromolecular material is polyvinylalcohol.

6. An electrode as claimed in claim 4 wherein the hydrophylic macromolecular material is a saponifiable cellulose derivative.

7. An electrode as claimed in claim 6 wherein the hydrophylic macromolecular material is cellulose acetate butyrate.

* * * * *

UNITED STATES PATENT AND TRADEMARK OFFICE
CERTIFICATE OF CORRECTION

PATENT NO. : 4,048,407
DATED : September 13, 1977
INVENTOR(S) : PIETER A. BOTER

It is certified that error appears in the above-identified patent and that said Letters Patent are hereby corrected as shown below:

ON THE TITLE PAGE

In Section [30] change Foreign Application Priority Data number from "7411044" to read --7511044--;

Signed and Sealed this

Twentieth Day of December 1977

[SEAL]

Attest:

RUTH C. MASON
Attesting Officer

LUTRELLE F. PARKER
Acting Commissioner of Patents and Trademarks